(12) United States Patent
Buckner (10) Patent No.: US 6,863,353 B1
(45) Date of Patent: Mar. 8, 2005

(54) WHEEL COVER DEVICE

(76) Inventor: George Buckner, 217 Silver Cir., Warner Robins, GA (US) 31093

( * ) Notice: Subject to any disclaimer, the term of this patent is extended or adjusted under 35 U.S.C. 154(b) by 0 days.

(21) Appl. No.: 10/348,531

(22) Filed: Jan. 20, 2003

(51) Int. Cl.$^7$ ................................................. B60B 7/02
(52) U.S. Cl. .............................. 301/37.103; 301/37.104
(58) Field of Search ........................ 301/37.101, 37.103, 301/37.104, 37.42; 118/504, 505

(56) References Cited

U.S. PATENT DOCUMENTS

| | | | | |
|---|---|---|---|---|
| 4,874,206 A | * | 10/1989 | Sampson | 301/37.103 |
| 5,423,599 A | * | 6/1995 | Sherod et al. | 301/37.103 |
| 5,435,630 A | * | 7/1995 | Tucker | 301/37.103 |
| 5,524,972 A | * | 6/1996 | Cailor et al. | 301/37.42 |
| 6,179,387 B1 | * | 1/2001 | Nasset et al. | 301/37.102 |
| 6,227,623 B1 | * | 5/2001 | Bellow | 301/37.42 |
| 6,457,780 B1 | * | 10/2002 | Ernst | 301/37.103 |
| 6,672,677 B1 | * | 1/2004 | Smith | 301/37.103 |

* cited by examiner

Primary Examiner—Russell D. Stormer
(74) Attorney, Agent, or Firm—Michael I Kroll (57) ABSTRACT

The present invention 10 discloses a domed covering element sized to cover and protect the entire wheel rim 14 while leaving the tire 16 fully exposed. A handle member 12 is fixedly attached to a central portion of the convex side of the covering element 10 to allow the user 18 to easily and rapidly put the present invention 10 into position and maintain it there with the use of just one hand so the other is free to spray or brush on the tire dressing 20. The domed shape of the covering element 10 keeps the user's hand 18 away from the dressing solution 20 during the application thereof as well as protecting the wheel rim 14 from getting scuffed from contact with the surface of the covering element. The present invention may include a resilient, compressible gasket 24 which encompasses the periphery of the covering element 10 to form an impermeable seal when a slight pressure is applied thereto. The gasket 24 assures that no solution 20 will pass therethrough and contact the wheel rim 14 even when heavily applied.

1 Claim, 8 Drawing Sheets

WHEEL COVER DEVICE

BACKGROUND OF THE INVENTION

1. Field of the Invention

The present invention relates generally to wheel protectors and, more specifically, to a domed wheel cover to protect chrome, aluminum and other such wheels when applying dressing to the associated tires.

2. Description of the Prior Art

There are other wheel protection devices known in the art. While these wheel protection devices may be suitable for the purposes for which they were designed, they would not be as suitable for the purposes of the present invention, as hereinafter described. The present invention seeks to overcome the shortcomings of the prior art by introducing a domed covering element having a handle member that is used to protect the wheel rim from cleaning agents that are employed when dressing the tires.

Many people dress the tires after washing their vehicles to give them a shiny, wet look but the substance often gets on the freshly cleaned chrome or aluminum wheel rims thereby compromising the polish thereof. Cleaning the substance off of the wheels can be time-consuming and annoying. Tire dressings may be applied in several manners including using a spray bottle or
brushing on a solution mixed in a bucket. Unfortunately it is almost inevitable that some dressing will drip or get sprayed onto the wheel rims regardless of the care taken by the user. The present invention provides a domed covering element sized to cover and protect the entire wheel rim while leaving the tire fully exposed. A handle member is fixedly attached to a central portion of the convex side of said covering element to allow the user to easily and rapidly put the present invention into position and maintain it there with the use of just one hand so the other is free to spray or brush on the tire dressing. The domed shape of the covering element keeps the users hand away from the dressing solution during the application thereof as well as protecting the wheel rim from getting scuffed from contact with the surface of the covering element.

Wheel rims and their respective tires come in various sizes and the present invention may be manufactured accordingly so the circumference of the covering element is sized to conform to the area where the tire meets the rim. The user may purchase the appropriate wheel rim cover according to the size of the wheels on the vehicle.

An additional element of the present invention is included wherein a resilient, compressible gasket encompasses the periphery of the covering element to form an impermeable seal when a slight pressure is applied thereto. The gasket assures that no solution will pass therethrough and contact the wheel even when heavily applied.

SUMMARY OF THE PRESENT INVENTION

The present invention discloses a domed covering element sized to cover and protect the entire wheel rim while leaving the tire fully exposed. A handle member is fixedly attached to a central portion of the convex side of the covering element to allow the user to easily and rapidly put the present invention into position and maintain it there with the use of just one hand so the other is free to spray or brush on the tire dressing. The domed shape of the covering element keeps the user's hand away from the dressing solution during the application thereof as well as protecting the wheel rim from getting scuffed from contact with the surface of the covering element. Wheel rims and their respective tires come in various sizes and the present invention may be manufactured accordingly so the circumference of the covering element is sized to conform to the area where the tire meets the rim. The present invention may include a resilient, compressible gasket which encompasses the periphery of the covering element to form an impermeable seal when a slight pressure is applied thereto. The gasket assures that no solution will pass therethrough and contact the wheel rim even when heavily applied.

A primary object of the present invention is to provide a wheel rim cover for preventing the solution for dressing tires to inadvertently contacting the wheel rim.

Another object of the present invention is to provide a wheel rim cover that will obviate unnecessary clean-up when washing a vehicle and dressing the tires.

Yet another object of the present invention is to provide a wheel rim cover that is easy to handle and manipulate.

Yet another object of the present invention is to provide a wheel rim cover that is inexpensive to manufacture and operate.

One more object of the present invention is to provide a wheel rim cover that is simple and easy to use.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWING FIGURES

In order that the invention may be more fully understood, it will now be described, by way of example, with reference to the accompanying drawing in which.

LIST OF REFERENCE NUMERALS

With regard to reference numerals used, the following numbering is used throughout the drawings.

10 present invention
12 handle
14 wheel rim
16 tire 18 hands of user
20 spray of cleaning solution
22 edge
24 gasket
26 vehicle.

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments since practitioners skilled in the art will recognize numerous other embodiments as well. For a definition of the complete scope of the invention, the reader is directed to the appended claims.

Figure 1:
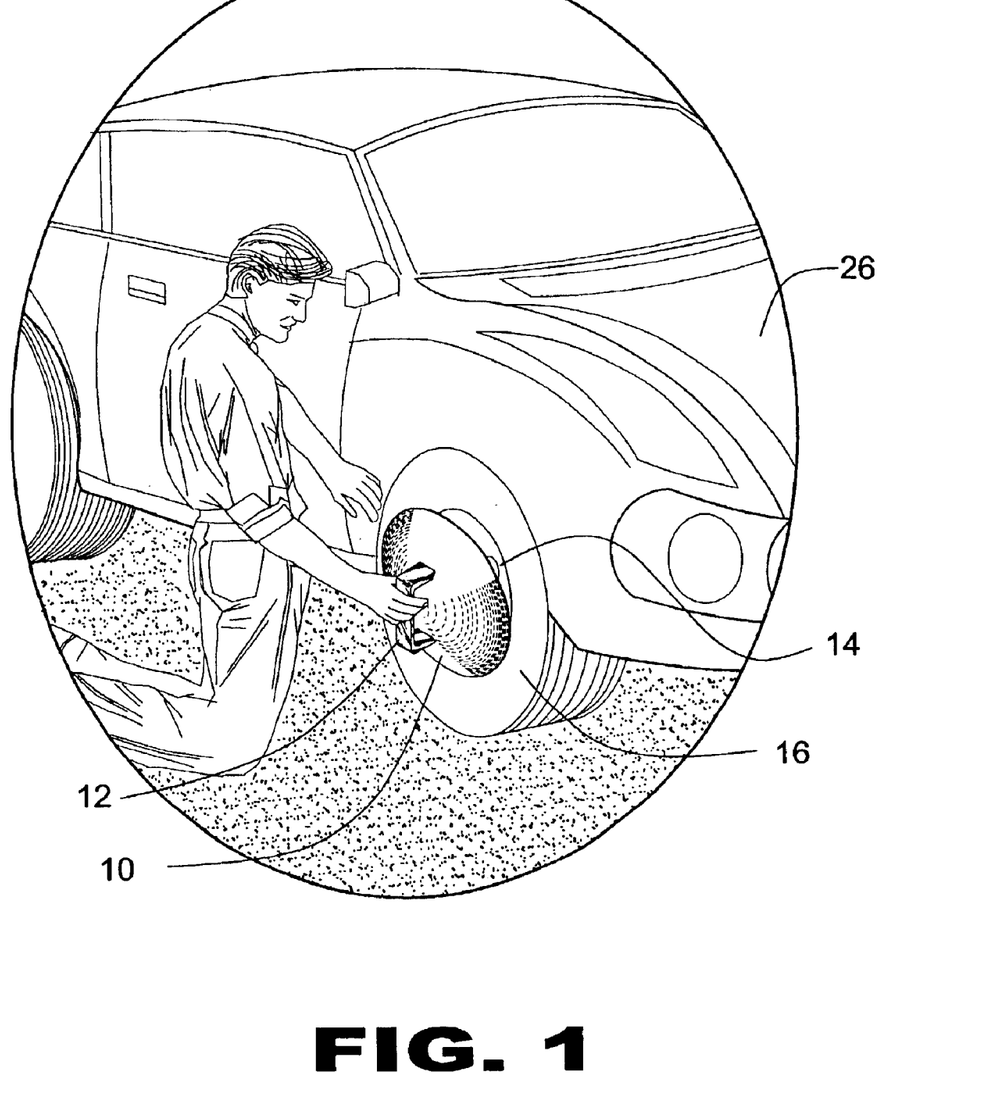
FIG. 1 is an illustrated view of the present invention in use.

Turning to FIG. 1, shown therein is an illustrated view of the present invention 10 in use. Shown is a wheel rim covering element 10 having a handle 12 fixedly attached thereto. The covering element is selectively positioned over a wheel rim 14 and moved to cover and engage the wheel rim whereby a user can apply a cleaning solution to the tire 16 while the covering element 10 prevents the cleaning solution from contacting the wheel rim. The wheel rim covering element 10 is a labor saving device obviating the usual cleanup of the wheel rim 14 after cleaning the tire 16. Also shown is vehicle 26.

Figure 2:
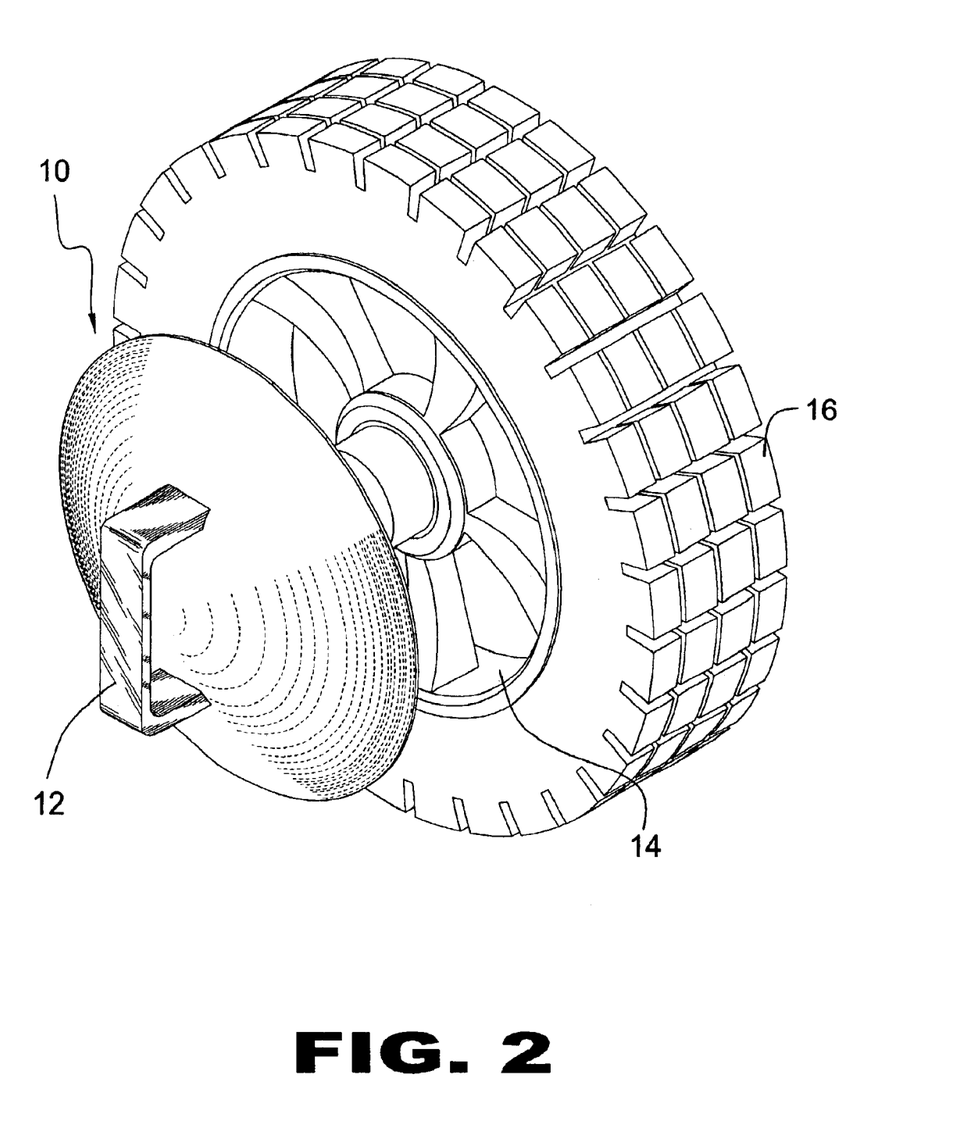
FIG. 2 is the present invention in use.

Turning to FIG. 2, shown therein is an enlarged view of the present invention 10. Shown is an enlarged view of the present invention 10 and a tire 16 having a wheel rim 14 that a user wishes to protect from a tire cleaning solution. The covering element 10 can be made in various sizes according to a plurality of wheel rim 14 sizes. The covering element 10 has a handle 12 for holding the covering element against the wheel rim 14 during application of a tire cleaning solution. The covering element 10 prevents the cleaning solution from contacting the wheel rim 14.

Figure 3:
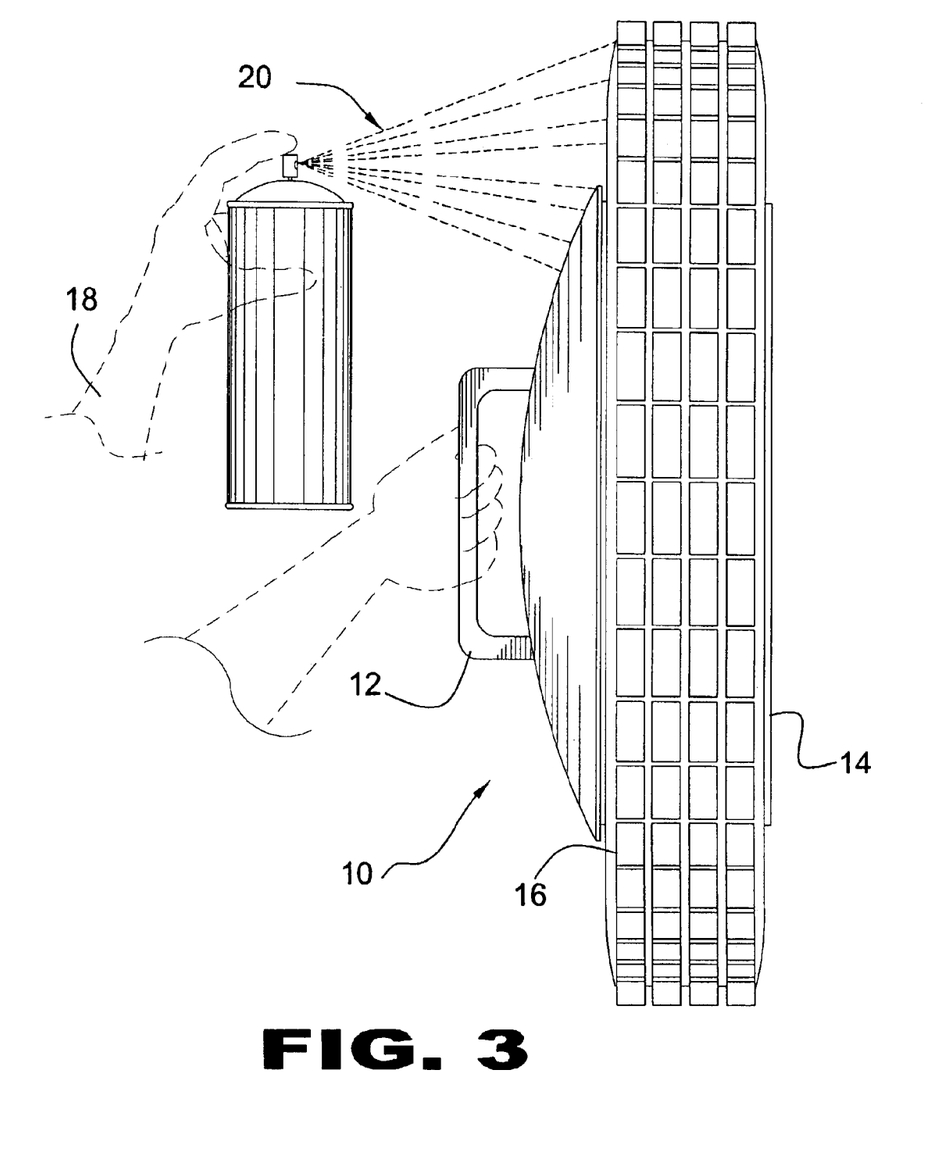
FIG. 3 is a side view of one squaring stop assembly.

Turning to FIG. 3, shown therein is the present invention 10 in use. Shown is the covering element of the present invention 10 being used to protect the wheel rim 14 from the overspray of an application of a tire spray cleaning solution, or the like 20. The domed covering element 10 keeps the user's hands 18 away from the overspray 20 while the user 18 holds the covering element 10 by its handle 12 with the outer rim edge of the covering element 10 engaging the wheel rim 14 to prevent any of the tire spray 20 from getting on the wheel rim 14.

Figure 4:
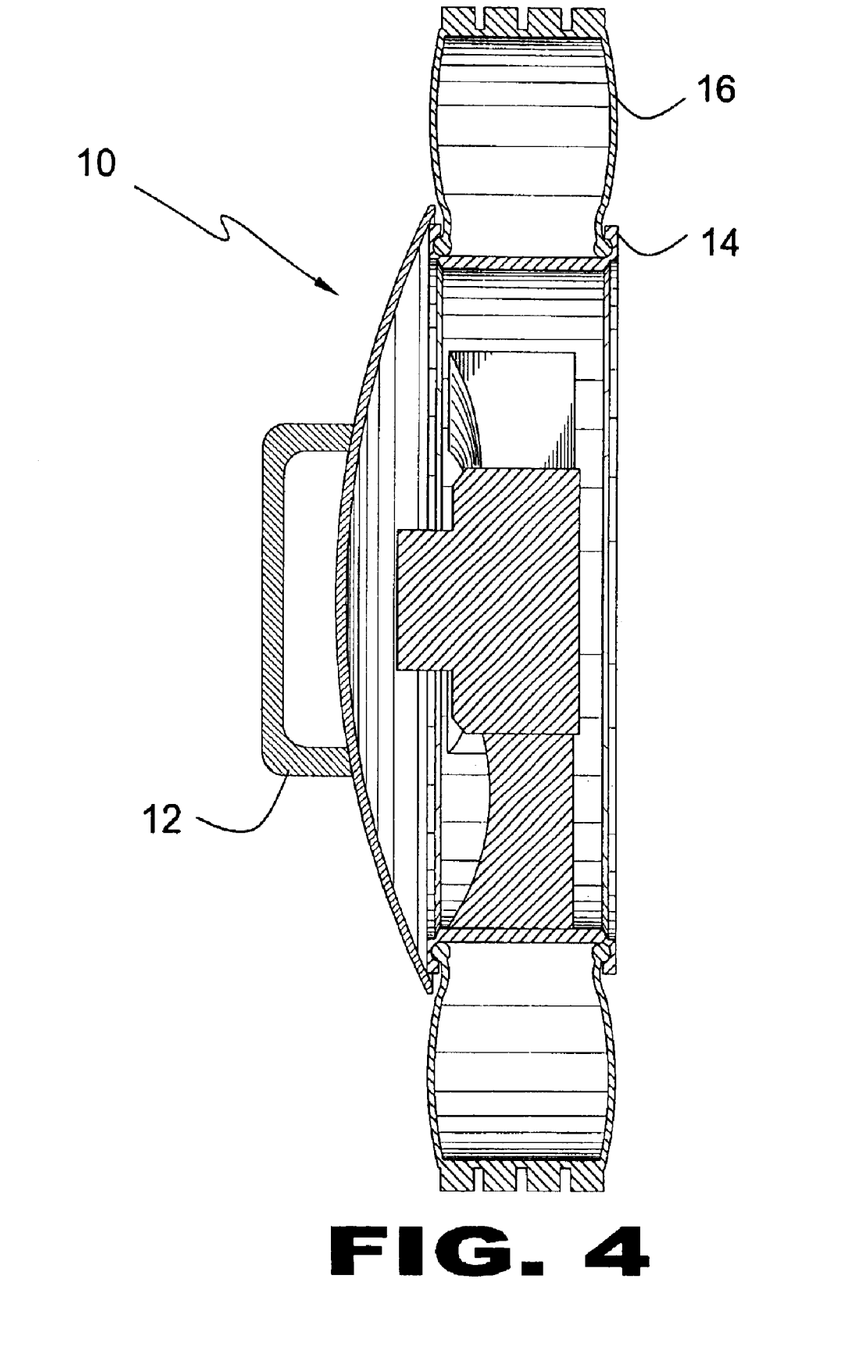
FIG. 4 is a sectional view of the present invention in use.

Turning to FIG. 4, shown therein is a sectional view of the present invention 10. Shown is a cut away view of the covering element 10 engaging a wheel rim 14 of a tire 16. The wheel rim covering element 10 has a centrally disposed handle 12 attached thereto providing means for a user to hold the covering element 10 in engagement with the wheel rim 14. Once in engagement with the wheel rim 14 the user can apply a cleaning solution to the tire 16 without getting any of the substance on the wheel rim 14. The arcuate shape of the domed covering element 10 keeps the user's hands spaced away from the application area and it is easily manipulated and repositioned by use of the handle 12.

Figure 5:
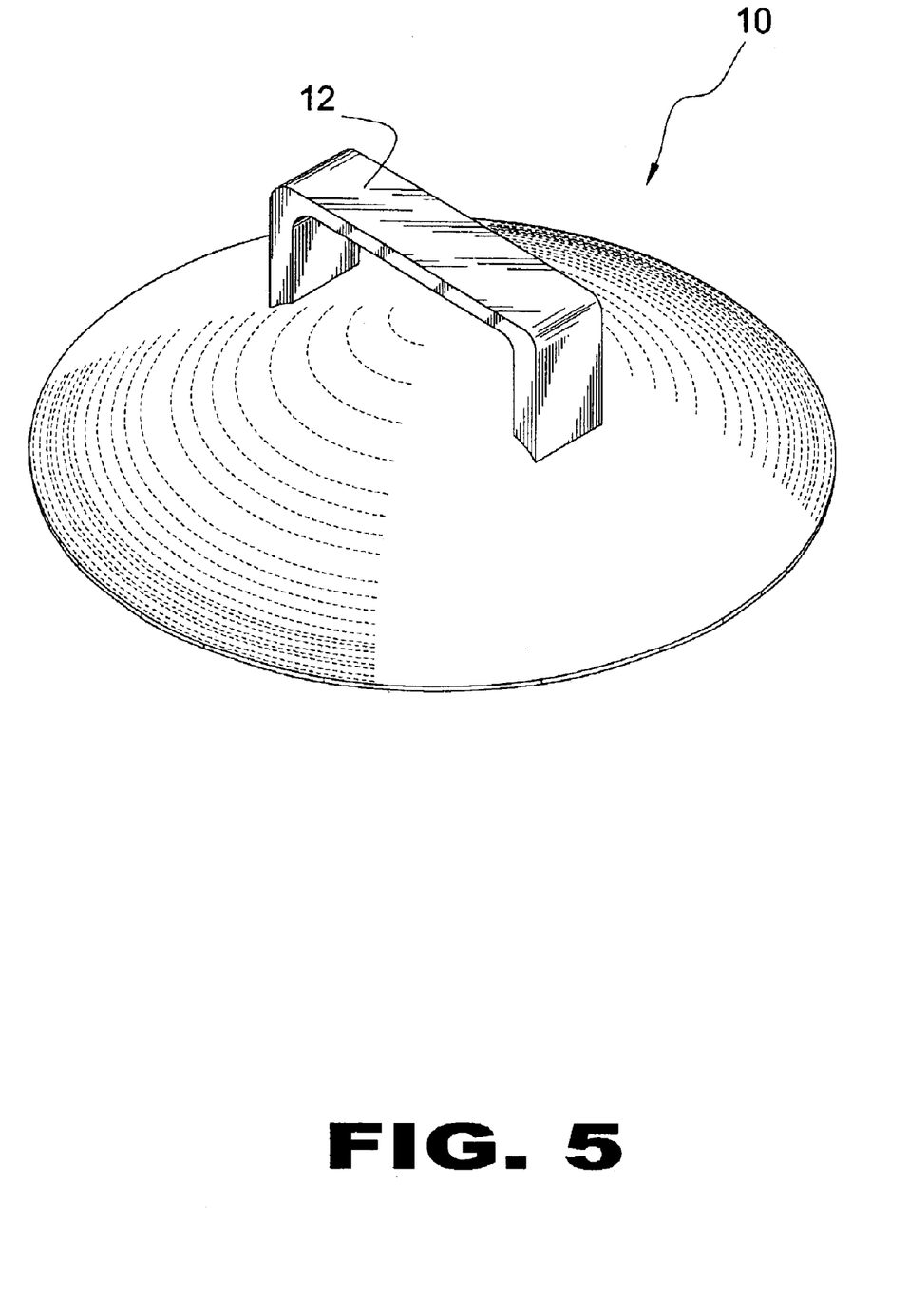
FIG. 5 is a perspective view of the present invention.

Turning to FIG. 5, shown therein is a perspective view of the present invention 10. Shown is a perspective view of the wheel rim covering element of the present invention 10 having a domed shape with a centrally disposed handle 12 providing means for manipulating device as well as keeping the user's hands spaced away from the tire cleaning application area. The device 10 is designed to be placed over and engage the outer periphery lip of the wheel rim while a cleaning solution is applied to the tire with the wheel rim covering element 10 preventing any of the solution from being applied to the wheel rim. The present invention 10 is a labor-saving device obviating the usual cleanup of the wheel rim after cleaning the tire.

Figure 6:
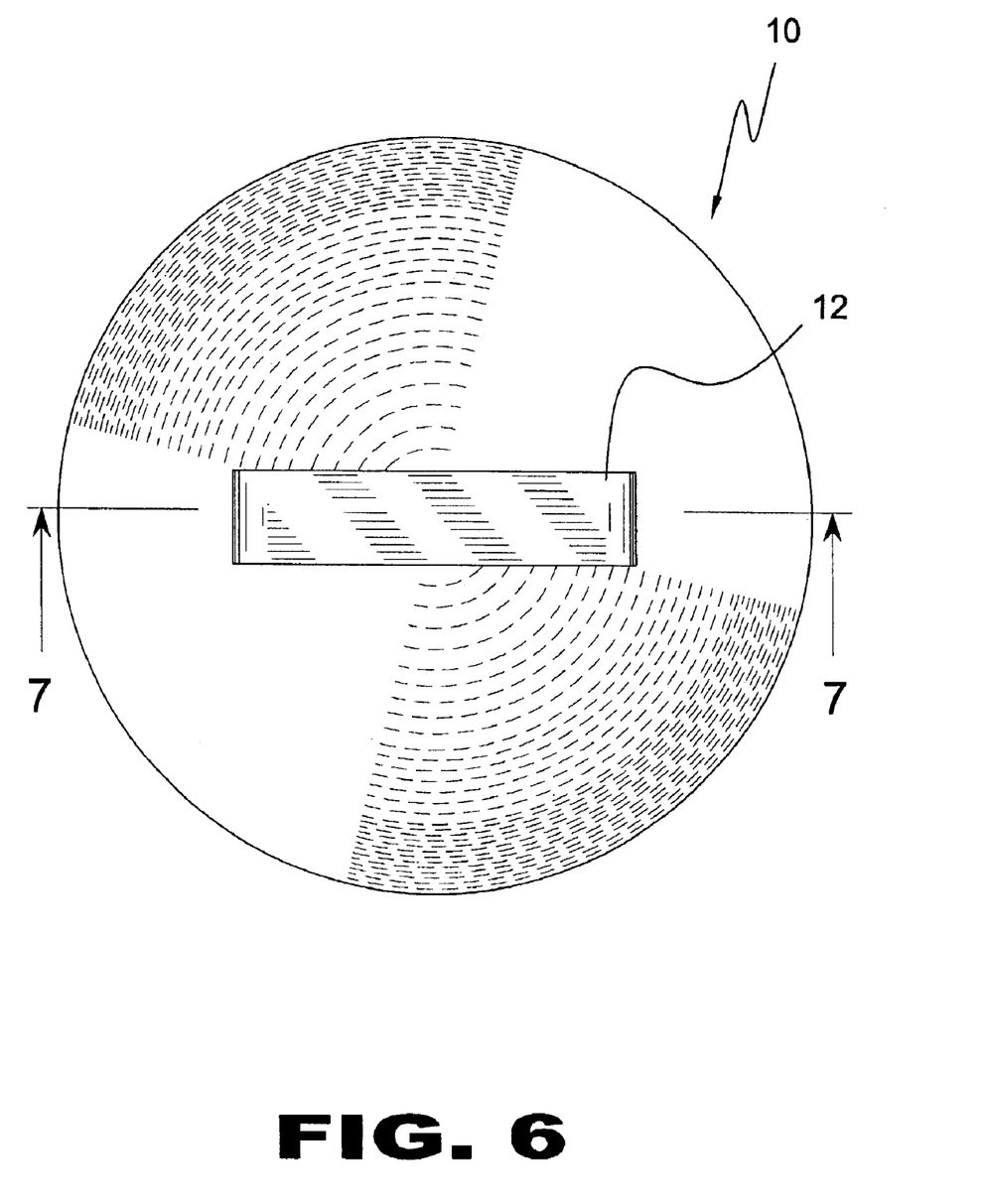
FIG. 6 is a top view of the present invention.

Turning to FIG. 6, shown therein is a top view of the present invention 10. Shown is a top view of the present invention 10 comprising a covering element having a handle 12 fixedly attached thereto. The covering element 10 can be selectively positioned over a wheel rim and moved to cover and engage the wheel rim whereby a user can apply a cleaning solution to the tire while the covering element 10 prevents the cleaning solution from contacting the wheel rim.

Figure 7:
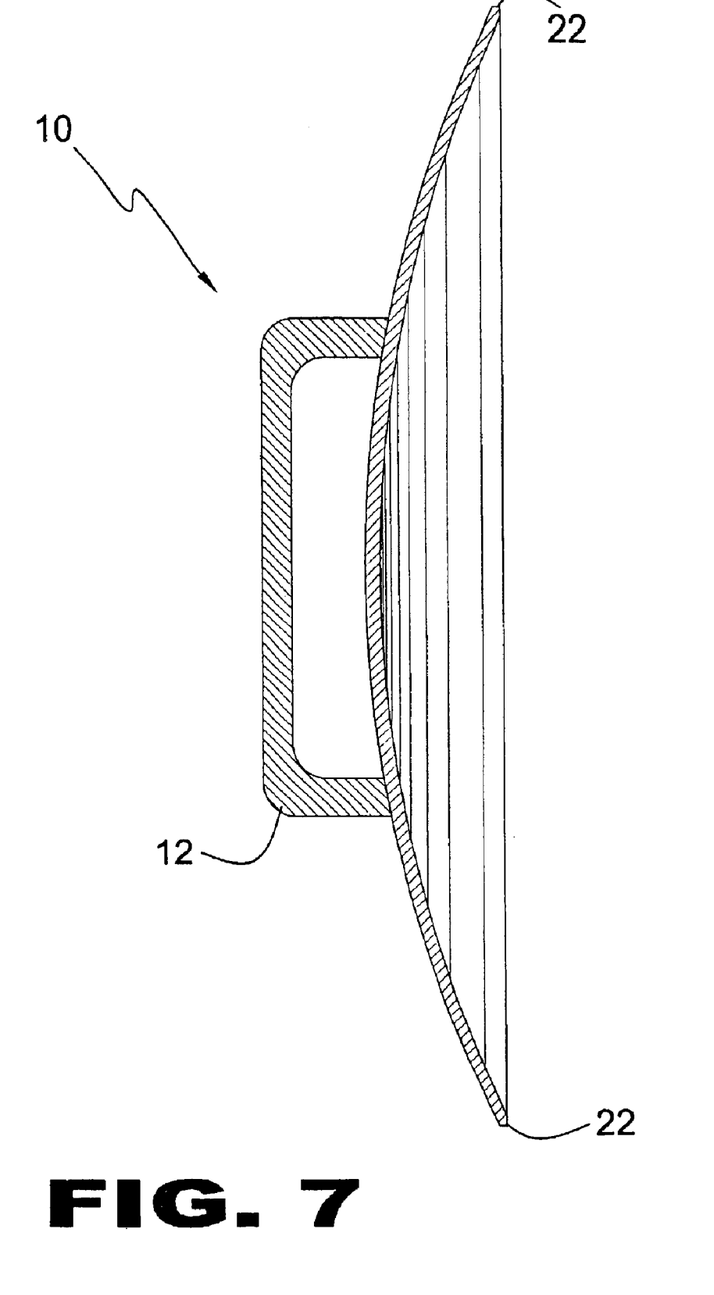
FIG. 7 is a cross sectional side view of the present invention.

Turning to FIG. 7, shown therein is a cross sectional side view of the present invention 10 taken from FIG. 6 as indicated. The wheel rim covering element 10 is a concave shaped, bowl-like structure having an outer periphery rim edge 22 for covering and engaging a wheel rim of a tire. The wheel rim covering element 10 has a centrally disposed handle 12 attached thereto providing means for a user to easily hold and manipulate the covering element 10 in engagement with the wheel rim. Once in engagement with the wheel rim the user can apply a substance to the tire without getting any of the substance on the wheel rim. The domed shape of the covering element 10 keeps the user's hands spaced away from the application area.

Figure 8:
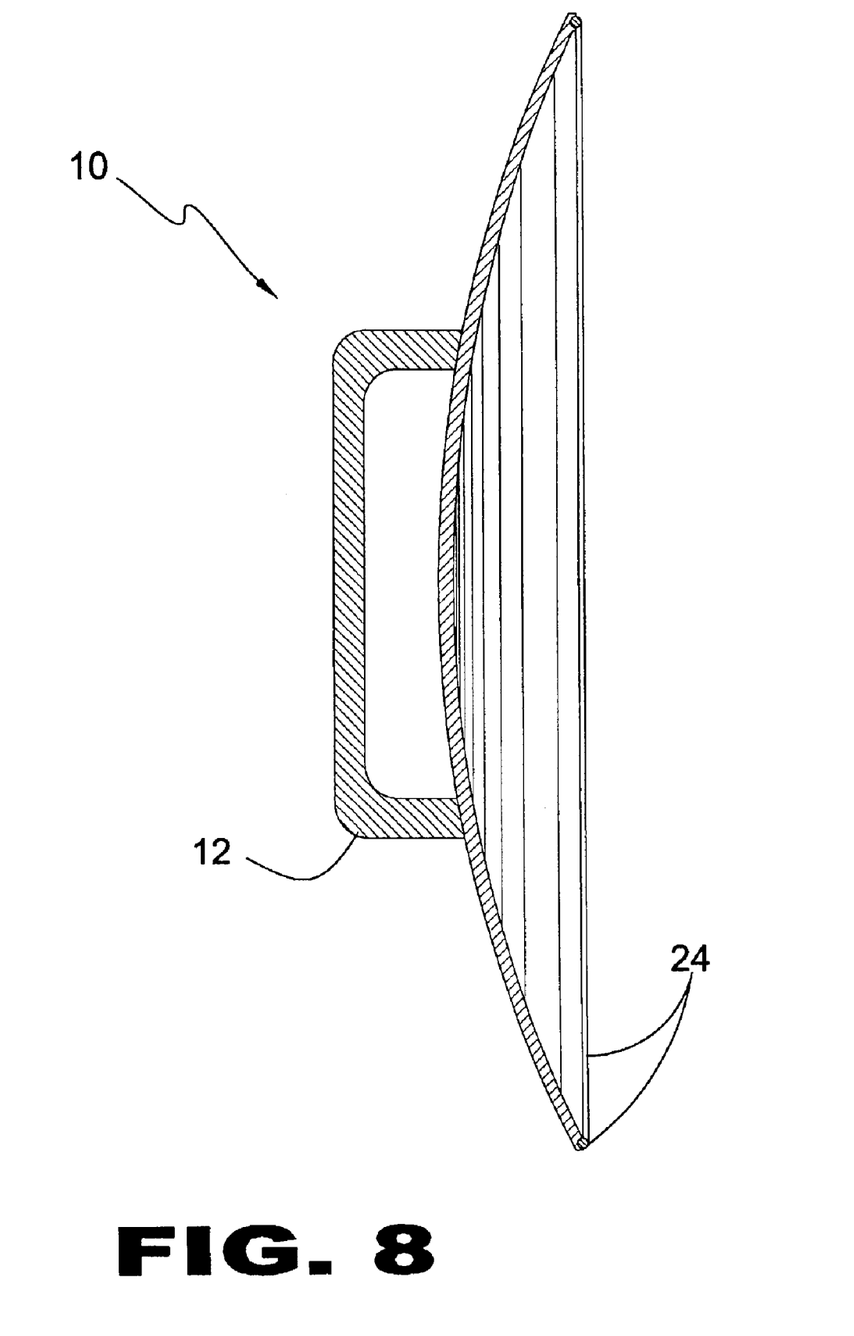
FIG. 8 is a sectional side view of the present invention with a gasket member.

Turning to FIG. 8, shown therein is a sectional side view of the present invention 10 having a gasket element 24 incorporated along and around the peripheral edge thereof in order, to form a watertight seal to provide greater efficiency in preventing overspray of cleaning solution from dripping beyond the gasket barrier 24. Also shown is handle 12.

What is claimed is:

1. A cover for a vehicle wheel for use while cleaning a tire mounted on the wheel consisting of:

a) a vehicle wheel having an inner rim, said rim having a tire mounted thereon, said rim having a peripheral edge;

b) a cover, said cover being concave shaped for covering said rim of said vehicle wheel while said tire is being cleaned, said cover being of uniform thickness and having a knife-shaped peripheral edge, said cover having an inside and an outside, the inside of said cover being smoothly concave with constant curvature to the peripheral edge of said cover;

c) said cover mating with said tire rim such that the peripheral edge of said rim is in contact with a surface on the inside of said cover so that the peripheral edge of said cover extends past and overlaps the peripheral edge of said rim to permit said rim to remain clean while said tire is being cleaned; and, d) a handle, said handle being centrally disposed on said outside of said cover to permit a user to grasp the cover.

* * * * *